United States Patent
Voss

[15] 3,635,625
[45] Jan. 18, 1972

[54] APPARATUS FOR CARVING A MATERIAL SHEET

[72] Inventor: Raymond G. Voss, Bartlesville, Okla.
[73] Assignee: Phillips Petroleum Company
[22] Filed: Jan. 12, 1970
[21] Appl. No.: 2,312

[52] U.S. Cl. .......................... 425/135, 425/162, 425/375, 425/385
[51] Int. Cl. ........................................ B29c 23/00
[58] Field of Search .......................... 18/1 R, 5 R, 6 R, 17 R

[56] References Cited

UNITED STATES PATENTS 3,414,937  12/1968  Malmgren ........................ 18/1 R
3,458,893  8/1969  Dieffenbach ..................... 18/1 R Primary Examiner—H. A. Kilby, Jr.
Attorney—Young and Quigg

[57] ABSTRACT

An apparatus for passing heated fluid onto a material sheet and moving said fluid along the sheet to carve a pathway on said sheet.

6 Claims, 4 Drawing Figures

INVENTOR.
R. G. VOSS
BY Young & Quigg
ATTORNEYS

APPARATUS FOR CARVING A MATERIAL SHEET

This invention relates to an apparatus and method for carving a material sheet. In another aspect, this invention relates to an apparatus and method for carving a plurality of nonlinear lines on a material sheet having material that is deformable at relatively low temperatures.

Heretofore, material sheets such as carpeting and the like have been carved on or embossed by contacting the surface of the material with a heated roller. In some cases the heated roller became fouled with polymer from the material sheet and it was then necessary to repeatedly clean said polymer from the roller. In this type carving, a different roller must be installed in order to change the pattern being carved on the material sheet. These rollers are expensive and require a relatively large amount of storage space and labor for installation.

It is therefore an object of this invention to provide an apparatus and method for carving a material sheet that is deformable at relatively low temperatures. Another object of this invention is to provide an apparatus and method for carving a material sheet of the above-described type whereby the carved pattern can be altered with decreased labor and equipment. Other aspects, objects, and advantages of the present invention will become apparent from a study of the disclosure, the appended claims, and the drawing.

The drawings are diagrammatic views of the material sheet and the apparatus of this invention.

Figure 1:
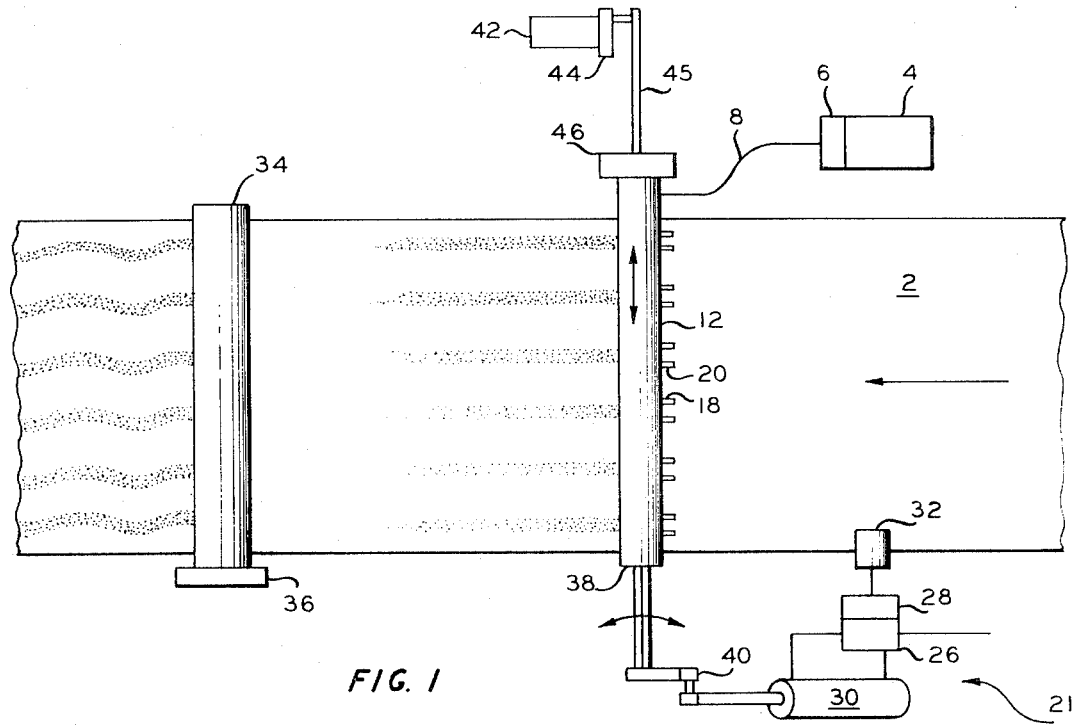
FIG. 1 is a view of the material sheet being carved and the apparatus of this invention.

FIG. 1 shows an elongated material sheet 2 that is being carved by the apparatus of this invention. As shown on the material sheet 2, the configuration of the carved portion of the sheet can be varied. The material to be carved can be formed of plastic fibers such as polyolefins, polyesters, acrylics, modacrylics, polycarbonates, polyureas, rayons, modrayons, nitrile, zein, polyimides, polyimidamides or other materials that are deformable at a relatively low temperature. Preferably the material sheet is nonwoven fabrics formed of these materials such as nonwoven carpeting, upholstering material and the like. For example, the polypropylene forming the carving surface of a material sheet can be deformed without damage by increasing the temperature of the polypropylene to a range of between 300° to 400° F. The carving temperature of other materials used for forming carpeting and the like are known in the art or can easily be determined by conventional laboratory tests.

Figure 4:
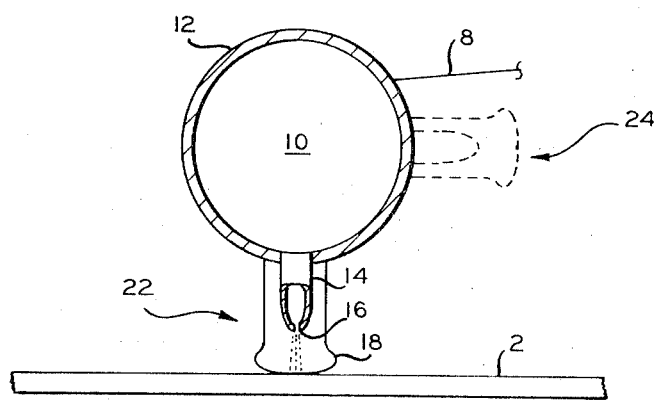
FIG. 4 is a partial sectional view through one of the nozzles of the apparatus of this invention.

The carving fluid used in this invention can be hot inert gas, hot air, steam, burning gas or any other hot gaseous fluid, such as burning propane for example, and is maintained and heated in a fluid reservoir 4 that is spaced from the material sheet 2. The heated fluid is removed from the reservoir 4 by a pump 6, discharged into line 8 and flows into a chamber 10 of a distributing element 12. The distributing element 12 extends across at least a portion of the material sheet and has at least one nozzle 14 connected therethrough and in communication with the chamber 10 for passing the heated fluid from the chamber 10 and directing said fluid to a position spaced from said nozzle 14 and against the adjacently positioned material sheet 2 for carving said sheet 2. Generally it is preferred that a plurality of nozzles 14 be attached to a common side of the distributing element 12 for directing a plurality of spaced-apart heated fluid streams into contact with the material sheet 2. By constructing the apparatus with a plurality of nozzles 14, the material sheet 2 can be carved at a number of locations during a single pass of the material 2 past the distributing element 12. The spacing of the outlet ends 16 of the nozzles 14 are preferably in a common plane spaced a preselected distance from the material sheet 2. By maintaining a common nozzle standoff distance from the material sheet 2, more uniform carved lines are formed on the material sheet 2. The uniformity of the carved lines is also controlled by attaching first and second shielding elements 18, 20 to the distributing element 12 with each element 18,20 positioned on adjacent sides of a separate nozzle with each shield extending from the distributing element 12 into contact with the material sheet in a first position 22 of the distributing element 12 as better shown in FIG. 4. These shielding elements 18, 20 prevent the heated fluid from contacting and deforming the portion of the material sheet 2 between adjacent nozzles 14.

Since prolonged contacting of the heated fluid at one position of the material sheet 2 damages said sheet 2, an actuating element 21 is attached to the distributing element 12 for moving the distributing element 12 in response to a received signal between a first material carving position 22 at which the outlet ends 16 of the nozzles 14 are spaced a first distance from the material sheet 2 and a second noncarving position 24 at which the outlet ends 16 of the nozzles 14 are spaced a second greater distance from the material sheet.

In the embodiment of the apparatus shown in FIG. 1, the actuating element 21 comprises a fluid reservoir (not shown), a two-way valve 26 connected to the fluid reservoir, a valve controlling element 28 attached to the two-way valve 26, and a cylinder 30 connected to the two-way valve and to the distributing element 12. A detecting element 32 is positioned in contact with the material sheet 2 and is connected to the controlling element 28 of the actuating element 21. A roller pair 34, for example, having a power source 36 is mounted in contact with the material sheet 2 for moving said material sheet 2 along its longitudinal axis relative to the distributing element 12 at a preselected rate of speed.

Upon movement of the material sheet 2 in response to movement of the roller pair 34, the detecting means 32 delivers one signal to the actuating element 21 for positioning the distributing element 12 and associated nozzles 14 at the first carving position 22 and upon termination of movement of said sheet 2, the detecting element 32 delivers another signal to the actuating element 21 for positioning the distributing element 12 and associated nozzles 14 at the second noncarving position 24.

The cylinder 30 is preferably a double-acting hydraulic cylinder in order to form a carving in having simple construction, sensitive control, and being easily operated and maintained. In the embodiment shown in FIG. 1, the cylinder is connected to an end 38 of the distributing element 12 by linkage 40 rotating the distributing element 12 about its longitudinal axis in response to actuation of the cylinder 30. In the embodiment of the apparatus shown in FIG. 2, the cylinder 30 is connected to and positioned relative to the distributing element 12 for vertical movement of the distributing element 12 relative to the material sheet 2 in response to actuation of the cylinder 30. In both embodiments, termination of movement of the material sheet 2 is detected by the detecting means which signals the controlling element 28 and causes the distributing element 12 to be moved by the cylinder 30 to a position at which the outlet ends 16 of the nozzles 14 are spaced a distance from the sheet 2 sufficient to prevent the fluid emitting from the nozzles 14 from carving the material 2.

Figure 2:
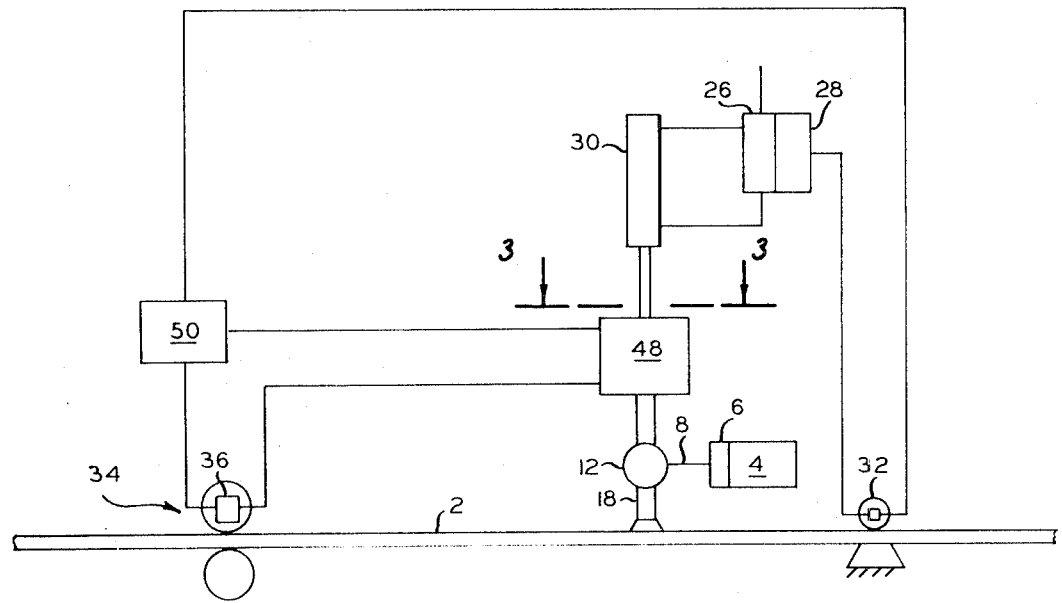
FIG. 2 is a diagrammatic frontal view of another embodiment of the apparatus of this invention.
Figure 3:
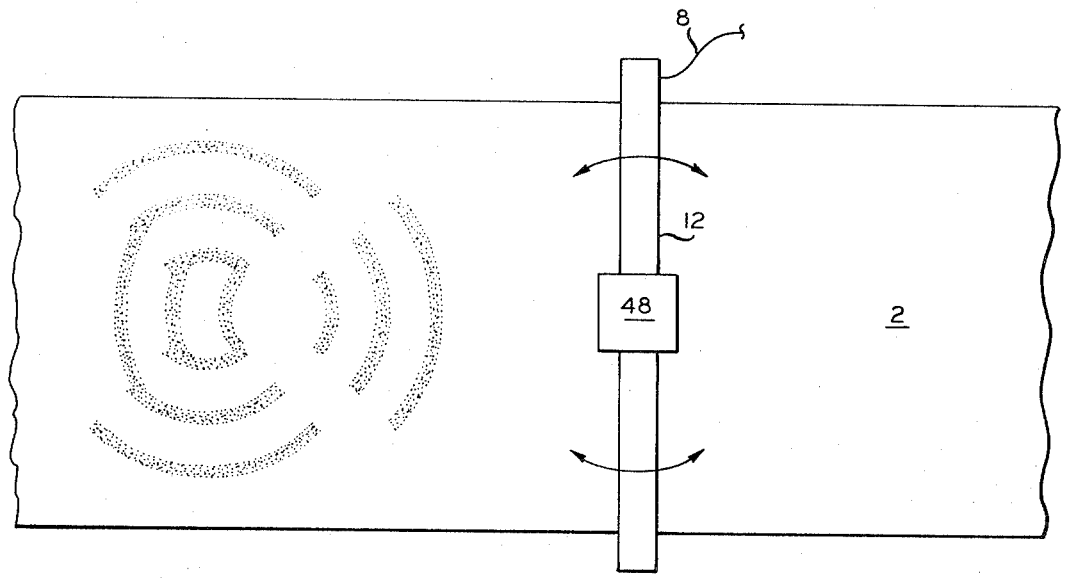
FIG. 3 is a diagrammatic plan view taken along line 3—3 of a portion of the apparatus shown in FIG. 2.

Means are also provided on the distributing element 12 for moving the distributing element 12 and associated nozzles 14 along a predetermined pathway relative to the material sheet 2 for carving a nonlinear design on said sheet 2. In the embodiment of the apparatus shown in FIG. 1, a power source 42 such as an electric motor has a bell crank 44 that is connected by connecting rod 45 to a swivel 46 on an end of the distributing element 12. Movement of the connecting rod 45 in response to actuation of the motor causes the distributing element 12 to reciprocate in one plane across a portion of the width of the material sheet 2 for moving the nozzles 14 along a predetermined pathway relative to said sheet 2. The swivel 46 is provided so that the distributing element 12 can be moved between the first and second position 22, 24 by the actuating element 21. As shown in FIG. 2, a motor 48 is connected to a middle portion of the distributing means 12 for rotary movement, better seen in FIG. 3, of the distributing element 12 in a plane substantially equidistant from the material sheet 2 for moving the associated nozzles along a predetermined pathway relative to the material sheet 2. A controlling means 50 is preferably connected to the power source 36 of the roller pair 34 and the motor 48 of the distributing element 12 for programming clockwise and counterclockwise rotation of the distributing element relative to longitudinal movement of the material sheet 2 by the roller pairs 34. By so constructing the means for programmed movement of the distributing element 12 relative to movement of the material sheet, a multitude of carving configurations can be achieved. It should be pointed out, however, that if a programmed pattern requires that the sheet 2 be maintained in a stationary position during movement of the distributing element 12, then the circuit of the detecting element 32 must be broken so that the actuating element 21 will not move the distributing element 12 to the second position.

In the operation of the apparatus of this invention the material sheet 2 is moved longitudinally past the carving apparatus. As the sheet 2 passes the distributing element 12 a heated fluid is passed from the fluid reservoir 4 through line 8, chamber 10, one or more nozzles 14, and into contact with the adjacent material sheet 2. The fluid heats adjacent portions of the material to a temperature at which the material 2 is permanently deformed. During carving operations, the distributing element 12 and associated nozzles 14 are moved by the power source 42 or motor 48 thereby causing the heated fluid stream to contact the sheet 2 along a preselected pathway or plurality of pathways. Upon termination of the movement of the sheet 2, the actuating element 21 is energized to move the distributing element 12 and associated nozzles 14 to a second noncarving position at which heated fluid emitting from the nozzles does not substantially deform the material 2. As shown in FIG. 2, the detecting element 32 can however be constructed so that it does not signal the termination of movement of the material sheet 2 and in this construction circles and other patterns can be carved in the material 2 when the material 2 is stationary.

It should be understood that various nozzle combinations can be used to provide different spacing between carved portions and carved patterns having differing widths. It should also be understood that the nozzle outlet end can have a length extending along the longitudinal axis of the distributing element for example to carve relatively large width areas. The operation of the apparatus can be programmed for differing materials and nozzle movements to provide a multiplicity of carved patterns. Other modifications and alteration of this invention will become apparent to those skilled in the art from the foregoing discussion and accompanying drawing, and it should be understood that this invention is not to be unduly limited thereto.

I claim:

1. An apparatus for carving a material sheet, said material sheet having material that is deformable at relatively low temperatures, comprising:
   an elongated distributing element;
   at least one nozzle mounted on the distributing element;
   a fluid reservoir;
   means for passing a carving fluid from the fluid reservoir, through the distributing element, the nozzle and to a position spaced from said nozzle; and
   means for moving the distributing element and associated nozzle along a predetermined pathway relative to the material sheet.

2. An apparatus, as set forth in claim 1, including
   a plurality of nozzles mounted on a common side of the distributing means;
   moving means for moving said material relative to the distributing element;
   an actuating element connected to the distributing element for moving said distributing element in response to a received signal between a first material carving position at which the outlet ends of the nozzles are spaced a first distance from the material and a second noncarving position at which the outlet ends of the nozzles are spaced a second greater distance from the material.
   a detecting element in contact with the material sheet and connected to the actuating element for delivering one signal to the actuating element in response to movement of the material sheet for positioning the distributing element at the first carving position and for delivering another signal to the actuating element in response to the termination of movement of the material sheet for positioning the distributing element at the second noncarving position and terminating carving of the material.

3. An apparatus, as set forth in claim 2, wherein the actuating element comprises:
   a two-way valve;
   a double-acting hydraulic cylinder connected to the valve and to the distributing element;
   a controlling element attached to the valve and to the detecting element for switching the valve and moving the distributing element between a first and second position in response to a signal received from the detecting element.

4. An apparatus, as set forth in claim 2, wherein the means for moving the distributing element and associated nozzle along a predetermined pathway relative to the material sheet comprises:
   a power source;
   a bell crank connected to the power source;
   a connecting rod attached to the bell crank;
   a swivel connected to the connecting rod and to one end of the
   distributing element for reciprocating the distributing element in one plane across a portion of the width of the material sheet.

5. An apparatus, as set forth in claim 2, wherein the means for moving the distributing element and associated nozzle along a predetermined pathway relative to the material sheet comprises:
   a motor connected to a middle portion of the distributing element for rotary movement of said element in a plane substantially equidistant from the material sheet;
   a controlling element connected to said motor for delivering a signal to the motor for rotating the distributing element in a clockwise and a counterclockwise direction at preselected time intervals.

6. An apparatus, as set forth in claim 2, wherein first and second shielding elements are attached to the distributing element on adjacent sides of each nozzle and extending from the distributing element into contact with the material sheet in the first position of said distributing element.

* * * * *